(12) United States Patent
Bangel et al.

(10) Patent No.: US 7,849,068 B2
(45) Date of Patent: *Dec. 7, 2010

(54) REMOTELY UPDATING A STATUS OF A DATA RECORD TO CANCEL A WORKSTATION DEPLOYMENT

(75) Inventors: Matthew J. Bangel, Poughkeepsie, NY (US); Robert G. Madsen, Pahoa, HI (US); Renee C. Mullins, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 242 days.

This patent is subject to a terminal disclaimer.

(21) Appl. No.: 12/240,159

(22) Filed: Sep. 29, 2008

(65) Prior Publication Data
US 2009/0024638 A1 Jan. 22, 2009

Related U.S. Application Data

(63) Continuation of application No. 11/219,110, filed on Sep. 2, 2005, now Pat. No. 7,472,126.

(51) Int. Cl.
*G06F 7/00* (2006.01)
(52) U.S. Cl. .................. 707/706; 715/968; 717/169
(58) Field of Classification Search .............. None
See application file for complete search history.

(56) References Cited

U.S. PATENT DOCUMENTS 5,481,710 A 1/1996 Keane et al.
6,182,086 B1 1/2001 Lomet et al.
6,668,338 B1 12/2003 Todd et al.
2002/0059328 A1 5/2002 Watkins
2002/0138595 A1 9/2002 Ruellan et al.
2002/0188675 A1 12/2002 Nakajima (Continued)

FOREIGN PATENT DOCUMENTS

JP 2004164037 A 5/2004

OTHER PUBLICATIONS

Notice of Allowance (Mail Date Aug. 13, 2008) for U.S. Appl. No. 11/219,110, filed Sep. 2, 2005; Confirmation No. 2910.

*Primary Examiner*—Pierre M Vital
*Assistant Examiner*—Truong V Vo
(74) *Attorney, Agent, or Firm*—Schmeiser, Olsen & Watts; William E. Schiesser

(57) ABSTRACT

A system and program product for updating a data record of a database to cancel a deployment of a computer workstation. A deployment status is changed from a starting status to a deployed status via intermediate statuses and then the deployment is canceled. From a decision tree stored in the database, a list of identifiers that identifies an ordered list of software routines is generated. An email message is created that includes a selectable object and a hidden field. The list of identifiers is inserted into the hidden field. The email message is sent to a user. The user's selection of the selectable object is received. The list of identifiers is obtained from the hidden field and the software routines are retrieved from the database. The software routines are executed in their order to update the status from deployed to the starting status via updates to the intermediate statuses.

6 Claims, 6 Drawing Sheets

U.S. PATENT DOCUMENTS

2004/0003009 A1  1/2004  Wilmot
2004/0216009 A1  10/2004 Kihara

2006/0259468 A1* 11/2006 Brooks et al. .................. 707/3

* cited by examiner

REMOTELY UPDATING A STATUS OF A DATA RECORD TO CANCEL A WORKSTATION DEPLOYMENT

This application is a continuation application claiming priority to Ser. No. 11/219,110, filed Sep. 2, 2005.

TECHNICAL FIELD

The present invention relates to a method and system for updating a status of a data record of a database, and more particularly to a technique for updating the status of a data record by a remote activation of a selectable object.

BACKGROUND OF THE INVENTION

Conventional techniques for updating a data record of a database through a series of statuses include time-consuming and/or inflexible procedures that require a user to perform multiple manual selections of selectable objects in one or more database views, or require the customized coding of database routines, each tailored to move the data record from a specific status interruption point to another specific status. These conventional techniques lack the flexibility to allow any current status of a data record to be updated to any other status without customized coding and without excessive user interaction. Thus, there is a need for an improved technique for updating the status of a data record.

SUMMARY OF THE INVENTION

In first embodiments, the present invention provides a method of updating, from a client computing unit, a data record of a database in a network computing environment, the method comprising:

obtaining an initial status of the data record and a target status of the data record;

automatically determining a list of one or more identifiers identifying, in a one-to-one correspondence, one or more actions in a sequence, each action being pre-programmed in and executable by a database management system managing the database, the database management system residing remotely from the client computing unit, wherein executing the one or more actions in the sequence updates the data record from the initial status to the target status;

receiving an e-mail at the client computing unit, the e-mail including a selectable object and the list of one or more identifiers;

selecting the selectable object at the client computing unit after the receiving and without utilizing a view of the database at the client computing unit;

responsive to the selecting, retrieving the one or more identifiers from the list to identify the one or more actions in the sequence; and responsive to the selecting, automatically executing the one or more actions in the sequence to update the data record from the initial status to the target status, wherein the one or more actions are identified via the retrieving to facilitate the automatically executing.

In second embodiments, the present invention provides a system of updating, from a client computing unit, a data record of a database in a network computing environment, the system comprising:

means for obtaining an initial status of the data record and a target status of the data record;

means for automatically determining a list of one or more identifiers identifying, in a one-to-one correspondence, one or more actions in a sequence, each action being pre-programmed in and executable by a database management system managing the database, the database management system residing remotely from the client computing unit, wherein executing the one or more actions in the sequence updates the data record from the initial status to the target status;

means for receiving an e-mail at the client computing unit, the e-mail including a selectable object and the list of one or more identifiers;

means for selecting the selectable object at the client computing unit after the receiving and without utilizing a view of the database at the client computing unit;

means for retrieving, responsive to the selecting, the one or more identifiers from the list to identify the one or more actions in the sequence; and means for automatically executing, responsive to the selecting, the one or more actions in the sequence to update the data record from the initial status to the target status, wherein the one or more actions are identified via the retrieving to facilitate the automatically executing.

In third embodiments, the present invention provides at least one program storage device readable by a machine, tangibly embodying at least one program of instructions executable by the machine to perform a method of updating, from a client computing unit, a data record of a database in a network computing environment, the method comprising:

obtaining an initial status of the data record and a target status of the data record;

automatically determining a list of one or more identifiers identifying, in a one-to-one correspondence, one or more actions in a sequence, each action being pre-programmed in and executable by a database management system managing the database, the database management system residing remotely from the client computing unit, wherein executing the one or more actions in the sequence updates the data record from the initial status to the target status;

receiving an e-mail at the client computing unit, the e-mail including a selectable object and the list of one or more identifiers;

selecting the selectable object at the client computing unit after the receiving and without utilizing a view of the database at the client computing unit;

responsive to the selecting, retrieving the one or more identifiers from the list to identify the one or more actions in the sequence; and responsive to the selecting, automatically executing the one or more actions in the sequence to update the data record from the initial status to the target status, wherein the one or more actions are identified via the retrieving to facilitate the automatically executing.

In fourth embodiments, the present invention provides a method for deploying computing infrastructure, comprising integrating computer-readable code into a computing system, wherein the code in combination with the computing system is capable of performing a process of updating, from a client computing unit, a data record of a database in a network computing environment, the process comprising:

obtaining an initial status of the data record and a target status of the data record;

automatically determining a list of one or more identifiers identifying, in a one-to-one correspondence, one or more actions in a sequence, each action being pre-programmed in and executable by a database management system managing the database, the database management system residing remotely from the client computing unit, wherein executing the one or more actions in the sequence updates the data record from the initial status to the target status;

receiving an e-mail at the client computing unit, the e-mail including a selectable object and the list of one or more identifiers;

selecting the selectable object at the client computing unit after the receiving and without utilizing a view of the database at the client computing unit;

responsive to the selecting, retrieving the one or more identifiers from the list to identify the one or more actions in the sequence; and responsive to the selecting, automatically executing the one or more actions in the sequence to update the data record from the initial status to the target status, wherein the one or more actions are identified via the retrieving to facilitate the automatically executing.

Advantageously, the present invention provides a system and method for updating a data record from any initial status to any target status without customized coding of multiple actions and without excessive user interaction.

BEST MODE FOR CARRYING OUT THE INVENTION

The technique described herein allows a user of a client computing unit to update a data record of a remote database with a single activation of a selectable object included in an electronic mail message received by the user. The activation executes code included in the selectable object that automatically executes an ordered sequence of actions pre-programmed in a database management system managing the database. The sequence of actions is determined by a configurable list of identifiers built by executing the logic of a decision tree.

Figure 1:
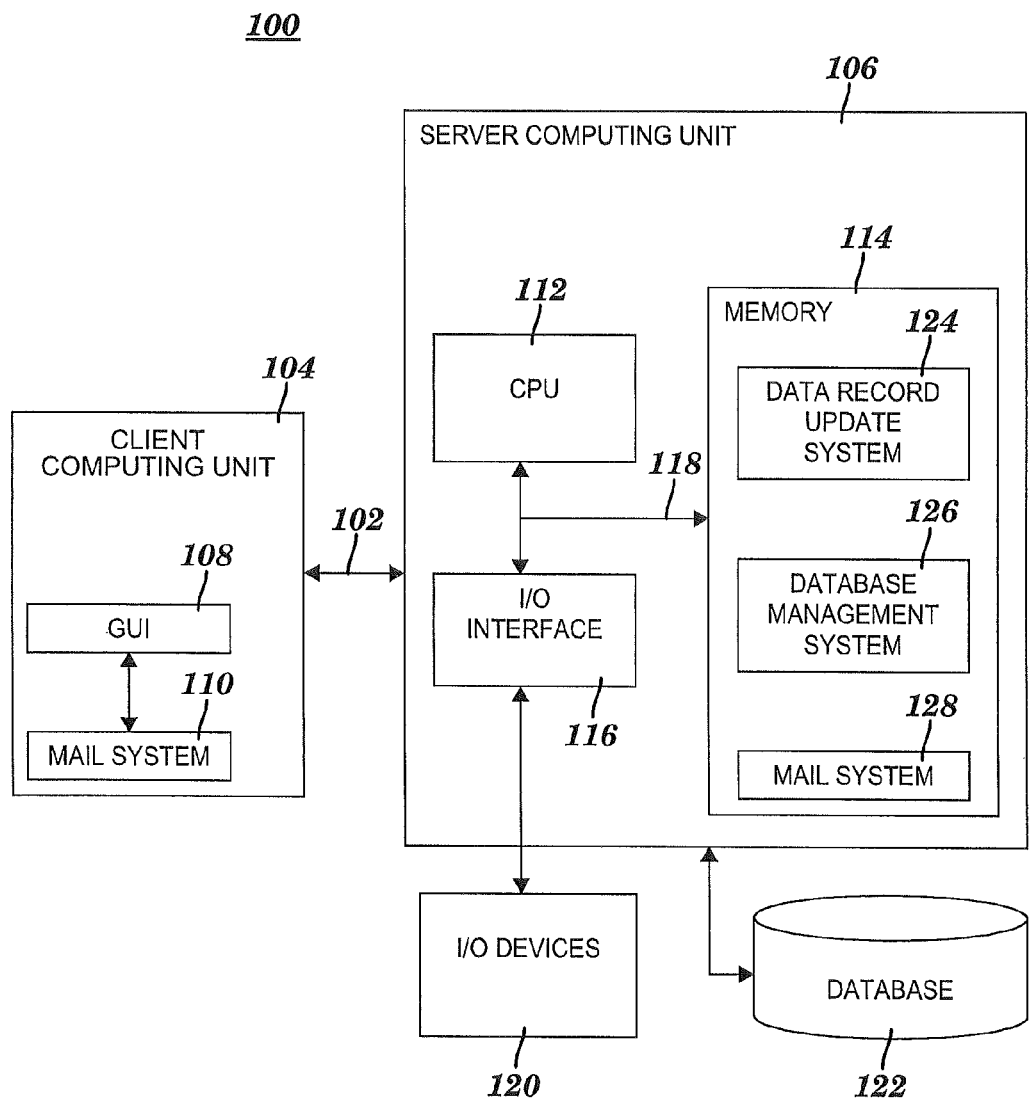
FIG. 1 is a block diagram of a system for updating a data record, in accordance with embodiments of the present invention.

FIG. 1 is a block diagram of a system for updating a data record, in accordance with embodiments of the present invention. FIG. 1 depicts a system 100 for communicating over a network 102. In particular, a client computing unit 104 and a server computing unit 106 communicate over network 102. Network 102 can comprise any type of communications link. For example, network 102 can comprise an addressable connection in a client-server environment that may utilize any combination of wireline and/or wireless transmission methods. Server 106 and client 104 utilize conventional network connectivity (e.g., Ethernet, Token Ring, or WiFi). Further, network 102 comprises any type of network, including the Internet, a wide area network (WAN), a local area network (LAN), or a virtual private network (VPN).

Client computing unit 104 includes a graphical user interface 108 by which a user of client computing unit 104 may initiate processing of e-mails created or received by mail system 110. For example, the user may activate a selectable object, such as a button, included in an e-mail received by mail system 110. Mail system 110 may be implemented using currently available mail systems, such as Lotus® Notes®, which is available from International Business Machines Corporation of Armonk, N.Y. Although not shown, client 104 typically includes components (e.g., central processing unit, memory, etc.) similar to components of server 106, which are described below.

Server computing unit 106 generally comprises a central processing unit (CPU) 112, a memory 114, an input/output (I/O) interface 116, a bus 118, I/O devices 120 and a database 122. CPU 112 performs computation and control functions of server 106. CPU 112 may comprise a single processing unit, or be distributed across one or more processing units in one or more locations (e.g., on a client and server). Memory 114 may comprise any known type of data storage and/or transmission media, including magnetic media, optical media, random access memory (RAM), read-only memory (ROM), a data cache, a data object, etc. Database 122 is stored on any type of storage unit, such as a magnetic disk drive or an optical disk drive. Moreover, similar to CPU 112, memory 114 and/or database 122 may reside at a single physical location, comprising one or more types of data storage, or be distributed across a plurality of physical systems in various forms. Further, memory 114 and/or database 122 can include data distributed across, for example, a LAN, WAN or storage area network (SAN) (not shown).

I/O interface 116 comprises any system for exchanging information to or from an external source. I/O devices 120 comprise any known type of external device, including a display monitor, keyboard, mouse, printer, speakers, handheld device, printer, facsimile, etc. Bus 118 provides a communication link between each of the components in server 106, and may comprise any type of transmission link, including electrical, optical, wireless, etc.

I/O interface 116 also allows server 106 to store and retrieve information (e.g., program instructions or data) from an auxiliary storage device, such as a non-volatile storage device (e.g., a CD-ROM drive which receives a CD-ROM disk) (not shown). Server 106 can store and retrieve information from other auxiliary storage devices (not shown), which can include a direct access storage device (DASD) (e.g., hard disk or floppy diskette), a magneto-optical disk drive, a tape drive, or a wireless communication device.

Server 106 comprises any type of computing unit capable of communicating with one or more other computing units (e.g., client 104). Similarly, client 104 comprises any type of computing unit capable of communicating with server 106 and connecting with database 122 via network 102. Examples of client computing unit 104 include a personal computer, laptop computer, handheld device, mobile phone, etc.

Memory 114 includes computer program code comprising a data record update system 124, a database management system 126 and a mail system 128. Systems 124, 126, 128 included in memory 114 implement the logic of a data record update process discussed below relative to FIG. 2. Data record update system 124 updates one or more data records of database 122. Database management system 126 manages database 122 and can be provided by, for example, DB2 or Lotus® Notes®. Mail system 128 transmits e-mail messages to, and receives e-mail messages from, client 104 via mail system 110. Mail system 128 is implemented by, for example, Lotus® Notes®. In an alternate embodiment, mail system 128 resides in another dedicated computing unit (not shown) instead of server 106. In this alternate embodiment, the dedicated computing unit includes components (e.g., CPU, memory, etc.) similar to the components of server 106, runs background processes to offload work of server 106, and utilizes a replication link to keep database resources of server 106 and the dedicated computing unit synchronized. Further, memory 114 may include other systems, such as an operating system (e.g., Linux) that runs on CPU 112 and provides control of various components within or connected to server 106.

Note that various modifications, additions, or deletions may be made to system 100 illustrated in FIG. 1 within the scope of the present invention, such as the addition of cache memory or other peripheral devices. FIG. 1 is presented to simply illustrate some of the salient features of system 100.

It is important to note that while the present invention has been (and will continue to be) described in the context of a fully functional computer system, those skilled in the art will appreciate that the mechanisms of the present invention are capable of being distributed as a program product in a variety of forms, and that the present invention applies equally regardless of the particular type of signal bearing media to actually carry out the distribution. Examples of signal bearing media include recordable type media such as floppy disks and CD-ROMs, and transmission type media such as digital and analog communication links, including wireless communication links.

Figure 2:
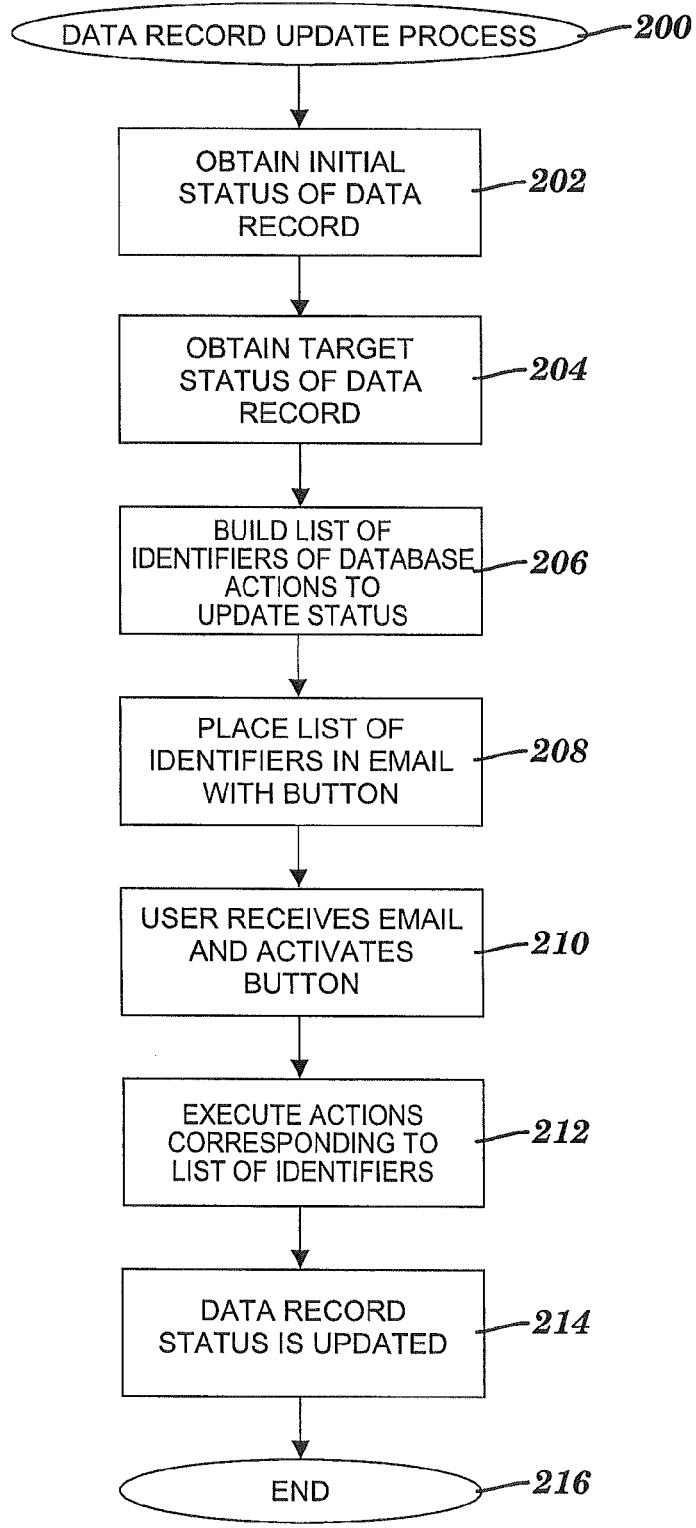
FIG. 2 is a flow chart of a process for updating a data record that can be implemented in the system of FIG. 1, in accordance with embodiments of the present invention.

FIG. 2 is a flow chart of a process for updating a data record that can be implemented in the system of FIG. 1, in accordance with embodiments of the present invention. The data record update process begins at step 200. At step 202, an initial status (e.g., the current status) of the data record to be updated (a.k.a. "the data record") is identified by a user and is obtained by a software routine that implements logic of a decision tree that will be discussed in detail below relative to FIG. 4. The data record is capable of being in any of a plurality of statuses (a.k.a. the possible statuses of the data record), and the initial status obtained in step 202 is any status of the plurality of statuses. At step 204, a target status of the data record is also identified by a user and obtained by the software routine. The target status is any status of the possible statuses of the data record, as long as the target status is different from the initial status.

The software routine implementing the decision tree logic resides on database 122 (see FIG. 1) and is managed by database management system 126 (see FIG. 1). In one embodiment, the initial status is provided by the current status of the data record in database 122 (see FIG. 1), and the target status is determined by the particular update operation that is to be performed on the data record. Both the initial status and target status are passed to the routine that implements the decision tree logic. An updateable list (e.g., passed from a configuration document) is provided by database 122 (see FIG. 1), and includes all possible data record statuses ordered according to a process flow of statuses. As used herein, a process flow of statuses is a flow chart that includes all the possible statuses of a data record, the possible paths that the data record can take when the data record is updated from one status to one or more other statuses, and the conditions that determine which of the possible paths are taken.

The software routine implementing the decision tree logic compares the initial status and the target status to the updateable list and determines if the desired update of the data record is moving the data record forward or backward through the process flow. Based on this determination, along with knowledge of the initial state, target state, and the updateable list, the software routine automatically determines, in step 206, a list of one or more identifiers that identify, in a one-to-one correspondence, a set one or more actions in a particular sequence. The list of one or more identifiers is a subset of a plurality of identifiers that are provided by database management system 126 (see FIG. 1) to indicate the possible actions that can be performed with regard to the data record being updated. The list is configurable by for example, a programmer altering the logic of the decision tree. Each action is code pre-programmed in and executable by database management system 126 (see FIG. 1) that manages database 122. Database management system 126 (see FIG. 1) resides remotely from the client computing unit 104 (see FIG. 1). The list is determined in step 206 so that an execution by database management system 126 (see FIG. 1) of the identified sequence of one or more actions updates the data record from the initial status to the target status.

The software routine that determines the list in step 206 also determines a series of statuses of the data record. The statuses in the series are the statuses of the data record as the data record is updated from the initial status to the target status. The series of statuses begins with the initial status and ends with the target status. Further, the series of statuses is a subset of a plurality of statuses, where the data record to be updated is capable of being in any status of the plurality of statuses. An execution of each action of the one or more actions identified by the list in step 206 updates the data record from one status of the series of statuses to another status of the series. The software routine that determines the list is executed at, for example, server computing unit 106 (see FIG. 1).

In one embodiment, the series of statuses includes one or more intermediate statuses and the update of the data record from the initial to the target status is performed by a set of updates of the data record that involve at least one intermediate status. Each intermediate status is different from the initial status and the target status. If there is only one intermediate status, the set of updates includes an update from the initial status to the intermediate status and an update from the intermediate status to the target status. If there are multiple intermediate statuses, the set of updates includes an update from the initial status to an intermediate status, an update from another intermediate status to the target status, and at least one intermediate status-to-intermediate status update.

After determining the list of one or more identifiers, an e-mail message is generated by mail system 128 (see FIG. 1). As one example, the e-mail is a Lotus® Notes® message. In step 208, the list of one or more identifiers is placed in the e-mail in, for example, a hidden field that is not visible to a user who receives and views the e-mail. The e-mail also includes a single selectable object that is selectable by a pointing device employed by, for instance, a user who receives the e-mail. One example of the selectable object is a graphical user interface button (e.g., a button provided by Lotus® Notes®) that is selected (i.e., activated) with a pointing device of a computing unit. The e-mail is sent by mail system 128 (see FIG. 1) to mail system 110 (see FIG. 1) of client computing unit 104 (see FIG. 1).

After client computing unit 104 (see FIG. 1) receives the e-mail, a user at the client computing unit in step 210 views the e-mail and selects the selectable object included in the e-mail with a single selection (i.e., activation) by a pointing device. The selectable object is selected by the user without the user accessing the database. That is, the user selects the selectable object without the database being opened in the user's workspace, and without the user utilizing a view of the database at client computing unit 104 (see FIG. 1). The activation of the selectable object automatically executes code included in the selectable object.

In one embodiment, one or more database views are displayed at client computing unit 104 (see FIG. 1) after the selectable object is selected as described above. The database views provide, for example, information to the user regarding the updates from one status to another, and prompt the user to acknowledge certain changes in status. Database views are also displayed at the client computing unit after the selection of the selectable object if, for example, the implementation of the process of FIG. 2 cannot employ a background process to execute the one or more actions identified by the list of step 206. In contrast, running the one or more actions in a background process on a separate thread by, for instance, a C++ multi-threaded application, avoids the need for opening the database in the user workspace of client computing unit 104 (see FIG. 1).

In another embodiment, the user receiving the e-mail in step 210 is authorized to approve the updating of the data record from the initial status to the target status via an execution of the actions identified by the list generated in step 206. After viewing information included in the e-mail of step 208, such as a name or identifier associated with the data record being updated, the user provides approval by activating the selectable object in step 210.

In still another embodiment, the time of the activation of the selectable object in step 210 is logged for audit purposes together with an identification of the user who performed the activation. Further, the one or more statuses to which the data record is updated in the subsequent steps of FIG. 2 are also tracked and logged. As the rest of the process of FIG. 2 is performed and the data record is updated, there is no loss of this logged information.

In step 212, the executing code directs database management system 126 (see FIG. 1) to retrieve the one or more identifiers from the list generated in step 206 and to automatically execute the one or more actions in the particular sequence identified by the retrieved one or more identifiers. The database management system utilizes the retrieved one or more identifiers to identify one or more database agents capable of executing the one or more actions. In step 214, the execution of the one or more actions updates the data record from the initial status to the target status, and the data record update process ends at step 216. As the selecting of the selectable object in step 210 remotely initiates the update of the data record, the selectable object is a remote execution tool.

In an alternate embodiment, the selectable object is a selectable Uniform Resource Locator (URL) link embedded in the e-mail. In response to selecting the URL link, code (e.g., a Java servlet) is executed to retrieve the list of one or more identifiers and execute the one or more actions that update the data record.

If the initial status and/or the target status is changed and the process of FIG. 2 is performed with the changed initial and/or target status, the list of one or more identifiers in step 208 is updated based on the initial and/or target status change, but the code included in the selectable object remains unchanged. That is, the initial status and the target status are any of the possible statuses of the data record without requiring the code included in the selectable object to be customized according to the initial and/or the target status. Further, a change to the initial and/or target status does not require a change to any of the code associated with the actions executed in step 212. Still further, the process of FIG. 2 can be used with a different set of possible data record statuses while retaining the same code included in the selectable object.

In an example of utilizing the process of FIG. 2, an employer's procedure of hiring a new employee (i.e., a new hire) includes deploying a computer workstation to the new hire. The workstation deployment procedure includes updating a data record through a series of multiple statuses over a process path associated with the deployment.

Figure 3A:
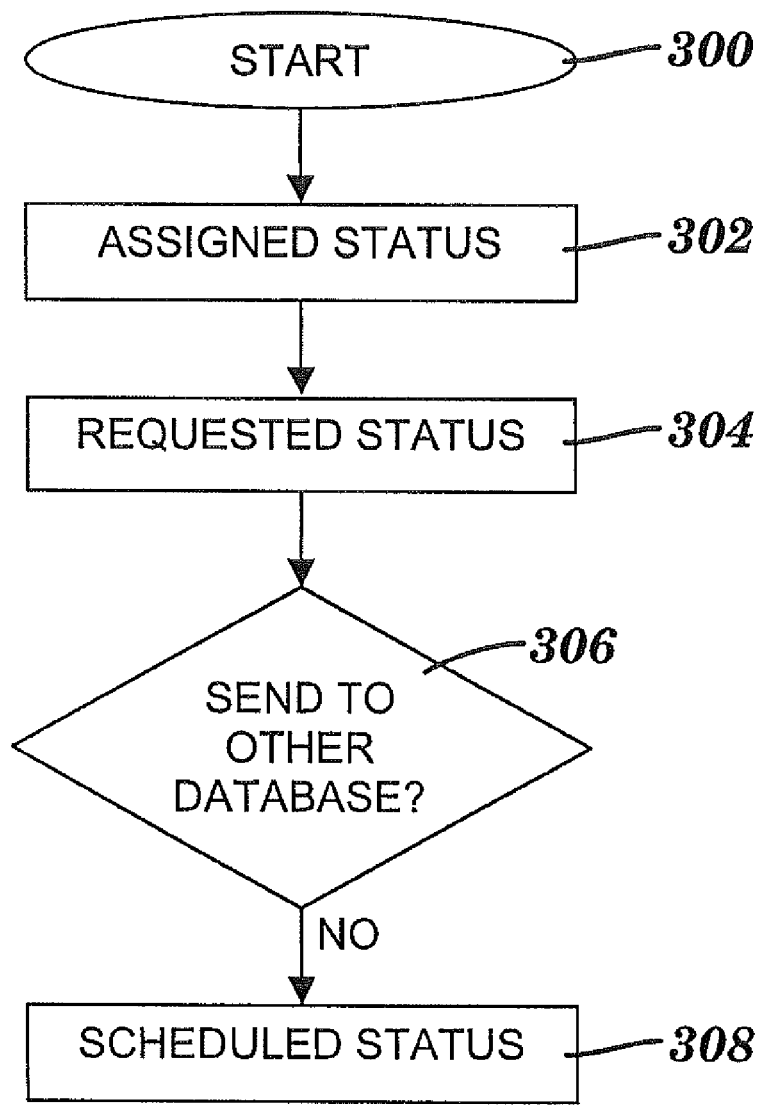
FIG. 3A is a flow chart of a process path and a current status of a first data record to be updated by the process of FIG. 2, in accordance with embodiments of the present invention.
Figure 3B:
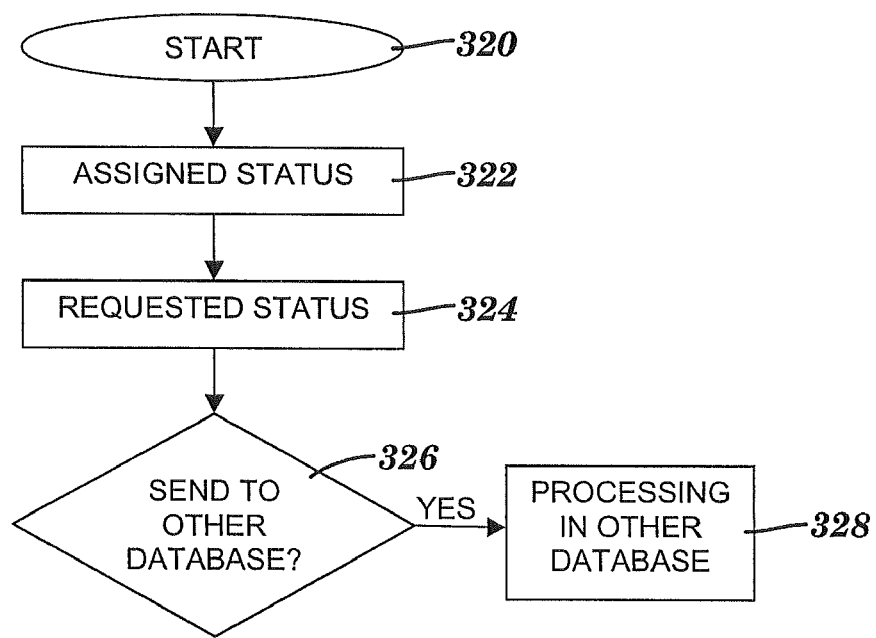
FIG. 3B is a flow chart of a process path and a current status of a second data record to be updated by the process of FIG. 2, in accordance with embodiments of the present invention.
Figure 3C:
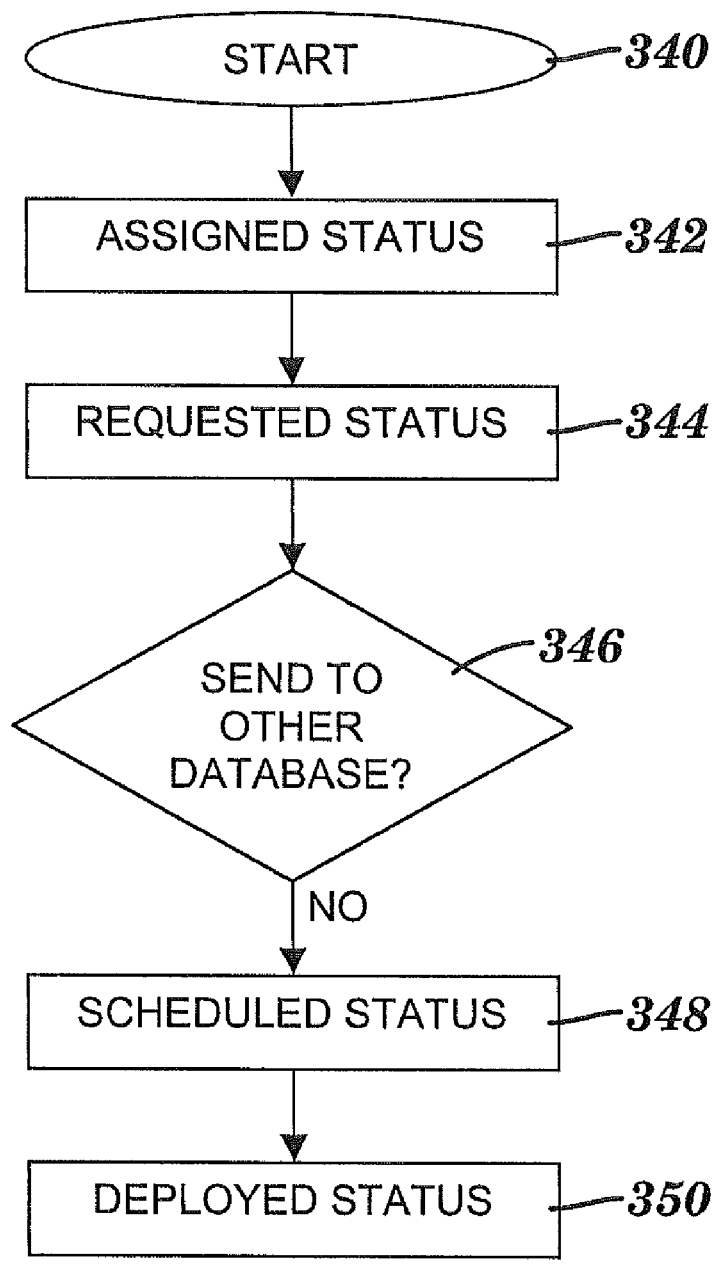
FIG. 3C is a flow chart of a process path and a current status of a third data record to be updated by the process of FIG. 2, in accordance with embodiments of the present invention.

Three different series of statuses for three different data records are shown in process paths depicted in FIGS. 3A-3C. Instead of being a complete flowchart, each process path of FIG. 3A, 3B or 3C indicates a particular path followed by a data record. The end of the process path indicates the current status of the data record.

FIG. 3A depicts a process path and a current status of a first data record to be updated by the process of FIG. 2. The process path for the first data record begins in a start status at step 300. In step 302, the first data record is placed in an assigned status. An assigned status indicates that a workstation has been allocated to a first new hire who is associated with the first data record. In step 304, the first data record is placed in a requested status. A requested status indicates that a workstation has been requested for the new hire. Inquiry step 306 determines whether the first data record is sent to another database for processing. In this case, the first data record is not sent to another database, and step 308 places the first data record in a scheduled status. A scheduled status indicates that a date for deployment of the workstation to the first new hire has been scheduled.

FIG. 3B depicts a process path and a current status of a second data record, which is to be updated by the process of FIG. 2, and which is associated with a second new hire. The process path of the second data record begins in a start status at step 320. In step 322, the second data record is placed in an assigned status. In step 324, the second data record is placed in a requested status. Inquiry step 326 determines that the second data record is to be processed in another database, and the processing of the second data record in the other database occurs in step 328. Processing in another database is performed when, for example, the deployment of the workstation is to be managed by a different business unit.

FIG. 3C depicts a process path and a current status of a third data record, which is to be updated by the process of FIG. 2, and which is associated with a third new hire. The process path of the third data record begins in a start status at step 340. The third data record is placed in an assigned status and a requested status in steps 342 and 344, respectively. Inquiry step 346 determines that the third data record is not be processed in another database. The third data record is placed in a scheduled status and a deployed status in steps 348 and 350, respectively. A deployed status indicates that the workstation which has been assigned, requested and scheduled has been deployed to the third new hire.

In this example, the three new hires associated with the three data records of FIGS. 3A-3C changed their minds and decided not to accept their respective employment offers. Because the new hires are declining the offers, each of the three data records needs to be cancelled and updated from its current status (i.e., initial status) to its start status (i.e., the target status) via its process path. Each update from the initial status to the target status utilizes an ordered sequence of actions, in which each action undoes the designation of each status along the process path of FIG. 3A, 3B or 3C. Since the initial statuses of the three data records are different, the sequence of actions required to move each data record back to its starting position is different for each data record.

Figure 4:
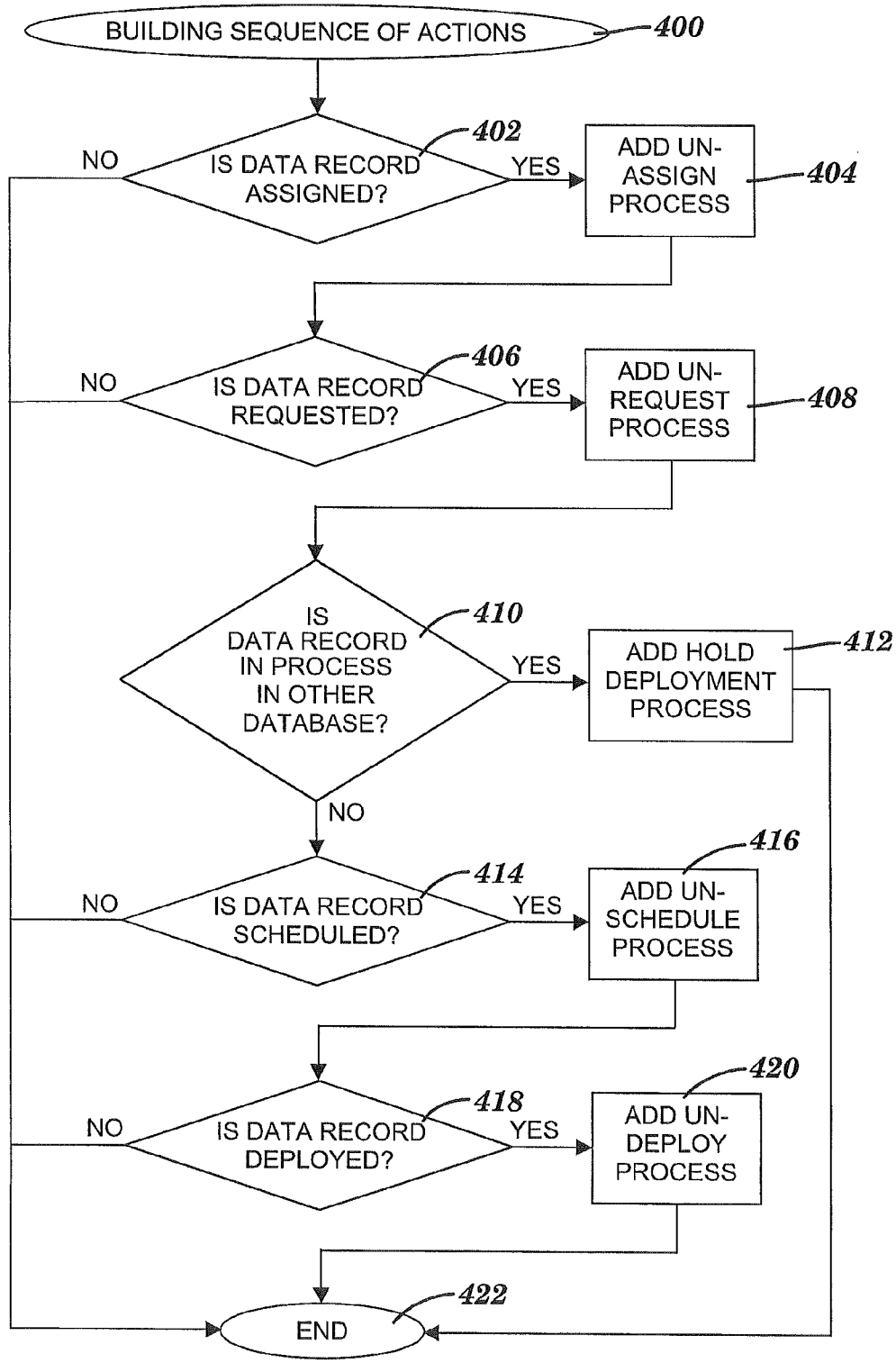
FIG. 4 is a flow chart for building a sequence of actions to be executed in the process of FIG. 2, in accordance with embodiments of the present invention.

The particular sequence of actions needed to update each data record to its target status is determined by logic of a decision tree implemented in the flow chart of FIG. 4. The process of building the sequence of actions begins at step 400 with an empty sequence of actions. Inquiry step 402 determines whether the data record has been designated as being in an assigned status. That is, step 402 determines if the data record is currently in an assigned status or had been in an assigned status prior to its current status. If an assigned status has been designated, step 404 adds an un-assign process to the sequence being built by the process of FIG. 4. Inquiry step 406 determines if a requested status has been designated for the data record. If the data record has been designated as requested, an un-request process is added to the sequence of actions in step 408. Inquiry step 410 determines if processing in another database has been designated for the data record. If processing in another database has been designated for the data record, a hold deployment process is added to the sequence of actions in step 412 to cancel the data record in the other database, and the building of the sequence of actions ends at step 422.

If inquiry step 410 determines that the data record has not been designated for processing in another database, then inquiry step 414 determines if a scheduled status has been designated for the data record. If the data record has been designated as scheduled, then an un-schedule process is added to the sequence of actions in step 416. Inquiry step 418 determines if a deployed status has been designated for the data record. If the data record has been designated as deployed, then an un-deploy process is added to the sequence of actions in step 420 and the building process ends at step 422. The end of the process at step 422 is also reached if steps 402, 406, 414, or 418 indicate that the data record has not been designated as assigned, requested, scheduled or deployed, respectively. The processes added in steps 404, 408, 412, 416 and 420 are added to the sequence of actions in a last-in-first-out order (i.e., the last process added to the sequence is the first process performed when the sequence of actions is executed, the second last process added is the second process performed, etc.).

The logic of FIG. 4 includes inquiries placed in an ordered fashion, starting with the inquiry closest to the target status (e.g., an inquiry about the status that the data record attains immediately after the start position). In an alternate embodiment, the decision tree logic can build the list of identifiers starting with the target status. Regardless of the order used by the decision tree logic, the list provided to the selectable object in step 208 (see FIG. 2) is the same.

In the example of FIG. 4, if the target status is changed, the logic of the decision tree also changes, and FIG. 4 would require an update to reflect the change in the decision tree. Further, the logic of the decision tree in the example above also requires a change if the target status is changed to a status that was not previously attained by the data record. The present invention, however, contemplates a target status being a parameter sent to the software routine implementing the logic of the decision tree. With the target status as a parameter, the software routine executes the logic of the decision tree for any given target status without requiring a change in the code of the software routine.

Following the execution of the building of the sequence of actions of FIG. 4, the sequence of actions for the first data record is un-schedule, un-request, and un-assign, which indicates the first-to-last order of actions to be performed to update the first data record from its scheduled status 308 (see FIG. 3A) to its start status 300 (see FIG. 3A). The sequence of actions determined by the process of FIG. 4 also determines an ordered list of identifiers that are in one-to-one correspondence with the actions in the sequence (see step 206 of FIG. 2). Each of the identifiers is recognized by database management system 126 as corresponding to a particular software routine or agent that executes the action corresponding to the identifier. In a preferred embodiment, the list of identifiers is placed in a hidden field of an e-mail together with a selectable object such as a single button (i.e., a single remote execution button). Other information may be included in visible portions of the e-mail (i.e., visible to the user who receives the e-mail), such as the name of the new hire who is declining the employment offer. An example of code that can be utilized to create the e-mail message is included in the Code Examples section presented below.

The e-mail is sent to a user at client computing unit 104 (see FIG. 1). The user receives the e-mail, view the e-mail via GUI 108 (see FIG. 1), and activates the single button with a single selection. This button activation is an activation remote from database 122 (see FIG. 1) and does not require a display of a view of database 122 (see FIG. 1) at the client computing unit. The button activation runs code that retrieves the identifiers corresponding to the un-schedule, un-request, and un-assign actions in the sequence determined by the process of FIG. 4. When executed by the button activation, the code included in the button also utilizes the retrieved identifiers to direct database management system 126 (see FIG. 1) to execute the sequence of un-schedule, un-request, and un-assign for the first data record. Executing this sequence of actions cancels the deployment of a computer workstation for the new hire associated with the first data record. An example of the code executed by the activation of the button is included in the Code Examples section presented below.

Cancellations of the computer workstation deployments for the second and third data records are performed in a manner similar to the one described above relative to the first data record. For the second data record, the sequence built by the process of FIG. 4 is hold deployment, un-request and un-assign. For the third data record, the sequence built by the process of FIG. 4 is un-deploy, un-schedule, un-request, and un-assign. As in the case of the first data record, the aforementioned sequences for the second and third data records are listed in a first-to-last order of actions to be performed to update the second and third data records from their respective initial statuses to their target statuses (i.e., their start positions).

The examples for the first, second and third data records involve backtracking through a process that initially moved each data record from a start status to a unique current status. The present invention, however, is not limited to backtracking and restoring a data record to a previous status, nor is it limited to moving a group of data records to a single target status. Instead, the present invention is a general process handling technique that provides a system and method of updating a data record from any initial status to any target status by employing a programmable remote execution tool (e.g., the button in the e-mail). For example, the general process handling technique also includes updating a data record in a forward direction to a status that had not been previously attained by the data record. In this example, a new hire accepts an employment offer, and the remote execution tool is activated once to update the data record of the new hire from its start status to an assigned status and to a requested status at the same time.

CODE EXAMPLES

The following routine in LotusScript® creates an e-mail message that includes a list of agent names (i.e., the list of identifiers in step 208 of FIG. 2) and a button that is to be activated in step 210 of FIG. 2 to update a document (i.e., the data record of FIG. 2) associated with a new hire.

```
Sub NewHireDeclineMail(link_doc As NotesDocument, db_config As NotesDocument, OperationProgram As
Variant, OperationLabel As Variant)
'------------------------------------------------
' This subroutine automatically sends an e-mail to the requestor
' of a new hire document created using the automated process.
' The e-mail document will contain a button capable of acting
' upon the new hire document in question, under any condition.
' link_doc = NotesDocument, the new hire document to be linked to
' db_config = NotesDocument, the configuration for the database that includes the new hire
' document
' OperationProgram = Variant, a string array of the names of the agents needed to update the new ' hire document
'------------------------------------------------
' Check to see if mail sending is enabled.
If db_config.AutoNewHireDeclineMail(0) = "Y" And Not(link_doc.BusinessArea(0) = "Product Development")
And Not(link_doc.MarkedForDeletion(0) = "Y") Then
Dim session As New NotesSession
Dim log_string(1) As String
Dim send_string( ) As String 'Used for mail sending
Redim send_string(1)
Set db = session.CurrentDatabase
Set maildoc=db.CreateDocument
maildoc.form="Memo"
maildoc.Subject="New Hire has declined offer, attention required"
Dim myrichtext As New NotesRichTextItem(maildoc, "Body")
Call myrichtext.AddNewLine(1)
Call myrichtext.AppendText("We have been notified by HR that a potential new hire in your business area has
declined the offer for employment. ")
Call myrichtext.AppendText("The New Hire record in CIM for " & link_doc.NewHireName(0) & " will require
special attention to close out the request. ")
If link_doc.AssetStatus(0) = "" Then
Call myrichtext.AppendText("Currently the record is in the CIM Status ""Un-Assigned"", and will need to be
removed. ")
Else
Call myrichtext.AppendText("Currently the record is in the CIM Status """ & link_doc.AssetStatus(0) & """, and
will need to be removed. ")
End If
Call myrichtext.AppendText("Please follow the instructions prepared below, they will help to guide you through the
rest of the process.")
' Place information in hidden fields of the e-mail document. The hidden fields are used by the
' button placed in the e-mail, but are not visible to a user who receives and views the e-mail.
maildoc.RemoteDBServer = db_config.CIMDatabaseServer(0)
maildoc.RemoteDBpathFN = db_config.CIMDatabasePathFN(0)
maildoc.RemoteDBView = "EmpSumm"
maildoc.RemoteDocID = link_doc.UniversalID
maildoc.RemoteDBAgents = OperationProgram
maildoc.RemoteDBAgentLabels = OperationLabel
'Place instructions to the Business Area Representative (BAR)
Call myrichtext.AddNewLine(2)
Call myrichtext.AppendText("Instructions for the BA Representative")
Call myrichtext.AddNewLine(1)
Call myrichtext.AppendText("-----------------------------------------------------------")
Call myrichtext.AddNewLine(1)
'Call myrichtext.AddNewLine(1)
'Call myrichtext.BeginSection("Instructions for the BA Representative")
Call myrichtext.AppendText("If this machine is being managed by IGS all that is required is for a hold deployment
status to be placed on the new hire. ")
Call myrichtext.AppendText("However, a machine not managed by IGS will require a more complex handling
process. Including Un-Requesting and Un-Assigning the new hire. ")
Call myrichtext.AppendText("Below this message is a button that is built toallow you to do both, but only works
under Notes ® V6 or higher. ")
Call myrichtext.AppendText("Please verify you are using a client capable of running this process, before you try to
utilize this action.")
Call myrichtext.AppendText("Also note the actions in the button may take several minutes, when you are ready
please press the button and follow further messages carefully. ")
Call myrichtext.AddNewLine(2)
'Place the button in the e-mail document.
Call myrichtext.AppendRTItem( db_config.GetFirstItem("AutoProcessButton") )
Call myrichtext.AddNewLine(2)
Call myrichtext.AppendText("If you are not capable of using the button above, you will have to perform these tasks
manually based on the situation presented.")
Call myrichtext.AppendText("Below is a button that will help you reach the document in question: ")
Call myrichtext.AddNewLine(2)
Call myrichtext.AppendRTItem( db_config.GetFirstItem("JustificationButton") )
Call myrichtext.AddNewLine(1)
Call myrichtext.AppendText("-----------------------------------------------------------")
'Call myrichtext.EndSection
'Place instructions to the Manager
Call myrichtext.AddNewLine(2)
Call myrichtext.AppendText("Instructions for the Manager")
```

```
Call myrichtext.AddNewLine(1)
Call myrichtext.AppendText("----------------------------------------------------------")
Call myrichtext.AddNewLine(1)
'Call myrichtext.BeginSection("Instructions for the Manager")
Call myrichtext.AppendText("This notice is being sent to enable your Business Area Representative(BAR) to
quickly respond to a computer deployment for a declined new hire. ")
Call myrichtext.AppendText("You DO NOT need to press the button(s) in this note (you might require server
connection information). ")
Call myrichtext.AppendText("If the decline information above is incorrect, you should send corrections to your HR
Staffing contact and also your BAR immediately to prevent the cancelling of the deployment. ")
Call myrichtext.AddNewLine(1)
Call myrichtext.AppendText("----------------------------------------------------------")
'Call myrichtext.EndSection
'Append Footer
Call myrichtext.AddNewLine(2)
Call myrichtext.AppendText(db__config.AutoEmailFooter(0))
'send_string(0) = "Matthew J Bangel/Endicott/IBM"
'send_string(1) = "Bob Madsen/Endicott/IBM"
send_string(0) = link_doc.RequestedBy(0)
send_string(1) = link_doc.ManagerEMailAddress(0)
maildoc.Importance="1"
maildoc.ReplyTo=StringArrayUnique(db__config.CIMBusinessSupportMail)
maildoc.SendTo=StringArrayUnique(send_string)
maildoc.CopyTo=StringArrayUnique(db__config.CIMBusinessSupportMail)
'Build log string and then log notification
Forall s In maildoc.SendTo
log_string(0) = log_string(0) & s & ", "
End Forall
Forall c In maildoc.CopyTo
log_string(1) = log_string(1) & c & ", "
End Forall
log_string(0) = Left$(log_string(0),Len(log_string(0))-2)
log_string(1) = Left$(log_string(1),Len(log_string(1))-2)
Call CIM__Log(link_doc,"New Hire Decline Notification",log_string)
If maildoc.SendTo(0) = "" Then
maildoc.SendTo = maildoc.CopyTo(0)
End If
Call maildoc.Send(False)
End If
End Sub
```

The following code written in Formula® is an example of source code included in the button in the e-mail message created by the code presented above. The source code presented below is executed in response to activating the button in step 210 of FIG. 2. The execution of the source code executes the actions in step 212 of FIG. 2.

```
REM {Declarations};
started := 0;
count := 1;
number := @Elements(RemoteDBAgents);
top := @Elements(RemoteDBAgents);
agentName := @Subset(RemoteDBAgents;count);
REM {Set environmental variable for what documents to select};
@SetEnvironment("CIMDocsForSelection";@Implode(RemoteDocID;";"));
REM { Open Remote Database, if the Notes ® version is correct };
@If(@TextToNumber(@Version) >= 184;@Do(
@Command( [FileOpenDatabase]; RemoteDBServer : RemoteDBpathFN ; RemoteDBView);
REM { Cycle through all actions, open the action from the remote database and execute };
@While((number != 0) & !(number < top & started= 0);@Do(
@If(agentName != "";@Do(
@Command([ToolsRunMacro];agentName);
@If(started;"";
@Do(result := @Prompt([YesNo];"Execute agents?";
"This action now requires that " + @Implode(RemoteDBAgentLabels;", ") + " all be executed against affected
documents. This may take some time to complete, would you like to proceed?");
@If(result != 1;number := 0;started := 1))));"");
count := count + 1;
number := number – 1;
agentList := @Subset(RemoteDBAgents;count);
agentName := @Subset(agentList;-1))));
@Prompt([Ok];"Incorrect Notes ® Version";"You are running the incorrect Notes ® Version for this action to work.
Please follow the additional instructions provided in the note in which it was received."))
```

The present invention discloses a method for deploying or integrating computing infrastructure, comprising integrating computer-readable code into computer system 100 (see FIG. 1), wherein the code in combination with computer system 100 (see FIG. 1) is capable of performing a process of updating a data record. The disclosed method for deploying or integrating computing infrastructure with the capabilities described herein can be offered as a service on a subscription service.

The present invention can be included, for example, in an article of manufacture (e.g., one or more computer program products) having, for instance, computer usable media. This media has embodied therein, for instance, computer-readable program code means for providing and facilitating the capabilities of the present invention. The article of manufacture can be included as part of the computer system or sold separately.

Additionally, at least one program storage device readable by machine, tangibly embodying at least one program of instructions executable by the machine, to perform the capabilities of the present invention, can be provided.

The flow diagrams depicted herein are provided by way of example. There may be variations to these diagrams or the steps (or operations) described herein without departing from the spirit of the invention. For instance, in certain cases, the steps may be performed in differing order, or steps may be added, deleted or modified. All of these variations are considered a part of the present invention as recited in the appended claims.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A first computing system comprising a processor and a computer-readable memory unit coupled to said processor, said memory unit containing instructions that when executed by said processor implement a method of updating a data record to cancel a deployment of a computer workstation, said method comprising:

changing a status stored in said data record from a first status to a second status, wherein said first status is a starting status in a deployment of said computer workstation to a first individual who is being processed as a new employee of a first entity, wherein said second status is a deployed status of said deployment of said computer workstation, wherein said data record is stored in a first database managed by said first entity, wherein said first database is stored in a computer data storage unit coupled to said first computing unit, and wherein said changing said status stored in said data record from said first status to said second status includes:

changing said status stored in said data record from said starting status to an assigned status that indicates that said computer workstation is allocated to said first individual;

changing, subsequent to said changing said status stored in said data record from said starting status to said assigned status, said status stored in said data record from said assigned status to a requested status that indicates that said computer workstation is requested for said first individual;

determining, subsequent to said changing said status stored in said data record from said assigned status to said requested status, that said data record is not to be processed in a second database managed by a second entity that is different from said first entity;

changing, subsequent to said determining that said data record is not to be processed in said second database managed by said second entity, said status stored in said data record from said requested status to a scheduled status that indicates that a date for said deployment of said computer workstation is scheduled; and changing, subsequent to said changing said status stored in said data record from said requested status to said scheduled status, said status stored in said data record from said scheduled status to said deployed status that indicates that said computer workstation is deployed to said first individual; and canceling, subsequent to said changing said status stored in said data record from said first status to said second status, said deployment of said computer workstation, wherein said canceling is based on a decision of said first individual to not be said new employee, and wherein said canceling includes:

automatically generating a list of identifiers that identify, in a one-to-one correspondence, an ordered list of software routines that includes a first software routine, a second software routine, a third software routine, and a fourth software routine, wherein said generating includes building said list of identifiers from a decision tree stored in said first database;

automatically creating an email message that includes a selectable object and a hidden field;

inserting, subsequent to said generating said list of identifiers, said list of identifiers into said hidden field included in said email message;

sending, subsequent to said inserting said list of identifiers, said email message to a user of a second computing unit that is in communication with said first computing unit via a network, wherein said hidden field is not viewable by said user of said second computing unit;

receiving, subsequent to said sending said email message, a selection of said selectable object by said user of said second computing unit via a pointing device, wherein said selection of said selectable object is a result of a single activation of said selectable object without requiring a display of any portion of said first database at said second computing unit;

obtaining, in response to said receiving said selection, said list of identifiers from said hidden field;

retrieving, in response to obtaining said list of identifiers, said ordered list of software routines that are stored in said first database;

executing, in response to said retrieving said ordered list of software routines, said first software routine, wherein said executing said first software routine includes updating said deployed status stored in said data record to said scheduled status;

executing, subsequent to said executing said first software routine, said second software routine, wherein said executing said second software routine includes updating said scheduled status stored in said data record to said requested status;

executing, subsequent to said executing said second software routine, said third software routine, wherein said executing said third software routine includes updating said requested status stored in said data record to said assigned status; and executing, subsequent to said executing said third software routine, said fourth software routine, wherein said executing said fourth software routine includes updating said assigned status stored in said data record to said starting status, and wherein said executing said fourth software routine further includes storing said starting status in said computer data storage unit to indicate a cancelation of said deployment of said computer workstation to said first individual.

2. The first computing system of claim 1, wherein said method further comprises:
changing a status stored in a second data record from a first status associated with said second data record to a second status associated with said second data record, wherein said first status associated with said second data record is a starting status of a deployment of a second computer workstation (second deployment) to a second individual who is being processed as a second new employee of said first entity, wherein said second status associated with said second data record is an externally deployed status of said second deployment wherein said second data record is stored in said first database managed by said first entity, and wherein said changing said status stored in said second data record from said first status associated with said second data record to said second status associated with said second data record includes:
changing said status stored in said second data record from said starting status of said second deployment to an assigned status of said second deployment that indicates that said second computer workstation is allocated to said second individual;
changing, subsequent to said changing said status stored in said second data record from said starting status of said second deployment to said assigned status of said second deployment, said status stored in said second data record from said assigned status of said second deployment to a requested status of said second deployment that indicates that said second computer workstation is requested for said second individual; and
changing, subsequent to said changing said status stored in said second data record from said assigned status of said second deployment to said requested status of said second deployment, said status stored in said second data record from said requested status of said second deployment to said externally deployed status of said second deployment that indicates that said second deployment of said second computer workstation is being processed in said second database managed by said second entity; and
canceling, subsequent to said changing said status stored in said second data record from said first status associated with said second data record to said second status associated with said second data record, said second deployment, wherein said canceling said second deployment is based on a decision of said second individual to not be said second new employee, and wherein said canceling said second deployment includes:
generating a second list of identifiers that identify, in a one-to-one correspondence, a second ordered list of software routines that includes said third software routine, said fourth software routine, and a fifth software routine, wherein said generating said second list of identifiers includes building said second list of identifiers from said decision tree stored in said first database;
creating a second email message that includes a second selectable object and a second hidden field;
inserting, subsequent to said generating said second list of identifiers, said second list of identifiers into said second hidden field included in said second email message;
sending, subsequent to said inserting said second list of identifiers, said second email message to said user of said second computing unit;
receiving, subsequent to said sending said second email message, a selection of said second selectable object by said user of said second computing unit via said pointing device, wherein said selection of said second selectable object is a result of a single activation of said second selectable object without requiring said display of any portion of said first database at said second computing unit;
obtaining, in response to said receiving said selection of said second selectable object, said second list of identifiers from said second hidden field;
retrieving, in response to obtaining said second list of identifiers, said second ordered list of software routines that are stored in said first database;
executing, in response to said retrieving said second ordered list of software routines, said fifth software routine, wherein said executing said fifth software routine includes updating said status of said second deployment from said externally deployed status of said second deployment to said requested status of said second deployment;
executing, subsequent to said executing said fifth software routine, said third software routine, wherein said executing said third software routine further includes updating said requested status of said second deployment to said assigned status of said second deployment; and
executing, subsequent to said executing said third software routine, said fourth software routine, wherein said executing said fourth software routine further includes updating said assigned status of said second deployment to said starting status of said second deployment, and wherein said executing said fourth software routine further includes storing, in said computer data storage unit, said starting status of said second deployment to indicate a cancellation of said second deployment.

3. The first computing system of claim 1, wherein said method further comprises:
changing a status stored in a second data record from a first status associated with said second data record to a second status associated with said second data record, wherein said first status associated with said second data record is a starting status of a deployment of a second computer workstation (second deployment) to a second individual who is being processed as a second new employee of said first entity, wherein said second status associated with said second data record is a scheduled status of said second deployment, wherein said second data record is stored in said first database managed by said first entity, and wherein said changing said status stored in said second data record from said first status associated with said second data record to said second status associated with said second data record includes:
changing said status stored in said second data record from said starting status of said second deployment to an assigned status of said second deployment that indicates that said second computer workstation is allocated to said second individual;

changing, subsequent to said changing said status stored in said second data record from said starting status of said second deployment to said assigned status of said second deployment, said status stored in said second data record from said assigned status of said second deployment to a requested status of said second deployment that indicates that said second computer workstation is requested for said second individual;

determining, subsequent to said changing said status stored in said second data record from said assigned status of said second deployment to said requested status of said second deployment, that said second data record is not to be processed in said second database managed by said second entity; and changing, subsequent to said determining that said second data record is not to be processed in said second database managed by said second entity, said status stored in said second data record from said requested status of said second deployment to a scheduled status of said second deployment that indicates that a date for said second deployment is scheduled; and canceling, subsequent to said changing said status stored in said second data record from said first status associated with said second data record to said second status associated with said second data record, said second deployment, wherein said canceling said second deployment is based on a decision of said second individual to not be said second new employee, and wherein said canceling said second deployment includes:

generating a second list of identifiers that identify, in a one-to-one correspondence, a second ordered list of software routines that includes said second software routine, said third software routine, and said fourth software routine, wherein said generating said second list of identifiers includes building said second list of identifiers from said decision tree stored in said first database;

creating a second email message that includes a second selectable object and a second hidden field;

inserting, subsequent to said generating said second list of identifiers, said second list of identifiers into said second hidden field included in said second email message;

sending, subsequent to said inserting said second list of identifiers, said second email message to said user of said second computing unit;

receiving, subsequent to said sending said second email message, a selection of said second selectable object by said user of said second computing unit via said pointing device, wherein said selection of said second selectable object is a result of a single activation of said second selectable object without requiring said display of any portion of said first database at said second computing unit;

obtaining, in response to said receiving said selection of said second selectable object, said second list of identifiers from said second hidden field;

retrieving, in response to obtaining said second list of identifiers, said second ordered list of software routines that are stored in said first database;

executing, in response to said retrieving said second ordered list of software routines, said second software routine, wherein said executing said second software routine further includes updating said status of said second deployment from said scheduled status of said second deployment to said requested status of said second deployment;

executing, subsequent to said executing said second software routine, said third software routine, wherein said executing said third software routine further includes updating said requested status of said second deployment to said assigned status of said second deployment; and executing, subsequent to said executing said third software routine, said fourth software routine, wherein said executing said fourth software routine further includes updating said assigned status of said second deployment to said starting status of said second deployment, and wherein said executing said fourth software routine further includes storing, in said computer data storage unit, said starting status of said second deployment to indicate a cancelation of said second deployment.

4. A non-transitory computer readable storage medium having a computer readable program code stored therein, said computer readable program code containing instructions configured to be executed by a processor of a computer system to implement a method of updating a data record to cancel a deployment of a computer workstation, said method comprising:

changing a status stored in said data record from a first status to a second status, wherein said first status is a starting status in a deployment of said computer workstation to a first individual who is being processed as a new employee of a first entity, wherein said second status is a deployed status of said deployment of said computer workstation, wherein said data record is stored in a first database managed by said first entity, wherein said first database is stored in a computer data storage unit coupled to said first computing unit, and wherein said changing said status stored in said data record from said first status to said second status includes:

changing said status stored in said data record from said starting status to an assigned status that indicates that said computer workstation is allocated to said first individual;

changing, subsequent to said changing said status stored in said data record from said starting status to said assigned status, said status stored in said data record from said assigned status to a requested status that indicates that said computer workstation is requested for said first individual;

determining, subsequent to said changing said status stored in said data record from said assigned status to said requested status, that said data record is not to be processed in a second database managed by a second entity that is different from said first entity;

changing, subsequent to said determining that said data record is not to be processed in said second database managed by said second entity, said status stored in said data record from said requested status to a scheduled status that indicates that a date for said deployment of said computer workstation is scheduled; and changing, subsequent to said changing said status stored in said data record from said requested status to said scheduled status, said status stored in said data record from said scheduled status to said deployed status that indicates that said computer workstation is deployed to said first individual; and canceling, subsequent to said changing said status stored in said data record from said first status to said second status, said deployment of said computer workstation, wherein said canceling is based on a decision of said first individual to not be said new employee, and wherein said canceling includes:
  automatically generating a list of identifiers that identify, in a one-to-one correspondence, an ordered list of software routines that includes a first software routine, a second software routine, a third software routine, and a fourth software routine, wherein said generating includes building said list of identifiers from a decision tree stored in said first database;
  automatically creating an email message that includes a selectable object and a hidden field;
  inserting, subsequent to said generating said list of identifiers, said list of identifiers into said hidden field included in said email message;
  sending, subsequent to said inserting said list of identifiers, said email message to a user of a second computing unit that is in communication with said first computing unit via a network, wherein said hidden field is not viewable by said user of said second computing unit;
  receiving, subsequent to said sending said email message, a selection of said selectable object by said user of said second computing unit via a pointing device, wherein said selection of said selectable object is a result of a single activation of said selectable object without requiring a display of any portion of said first database at said second computing unit;
  obtaining, in response to said receiving said selection, said list of identifiers from said hidden field;
  retrieving, in response to obtaining said list of identifiers, said ordered list of software routines that are stored in said first database;
  executing, in response to said retrieving said ordered list of software routines, said first software routine, wherein said executing said first software routine includes updating said deployed status stored in said data record to said scheduled status;
  executing, subsequent to said executing said first software routine, said second software routine, wherein said executing said second software routine includes updating said scheduled status stored in said data record to said requested status;
  executing, subsequent to said executing said second software routine, said third software routine, wherein said executing said third software routine includes updating said requested status stored in said data record to said assigned status; and
  executing, subsequent to said executing said third software routine, said fourth software routine, wherein said executing said fourth software routine includes updating said assigned status stored in said data record to said starting status, and wherein said executing said fourth software routine further includes storing said starting status in said computer data storage unit to indicate a cancelation of said deployment of said computer workstation to said first individual.

5. The non-transitory computer readable storage medium, wherein said method further comprises:
  changing a status stored in a second data record from a first status associated with said second data record to a second status associated with said second data record, wherein said first status associated with said second data record is a starting status of a deployment of a second computer workstation (second deployment) to a second individual who is being processed as a second new employee of said first entity, wherein said second status associated with said second data record is an externally deployed status of said second deployment, wherein said second data record is stored in said first database managed by said first entity, and wherein said changing said status stored in said second data record from said first status associated with said second data record to said second status associated with said second data record includes:
    changing said status stored in said second data record from said starting status of said second deployment to an assigned status of said second deployment that indicates that said second computer workstation is allocated to said second individual;
    changing, subsequent to said changing said status stored in said second data record from said starting status of said second deployment to said assigned status of said second deployment, said status stored in said second data record from said assigned status of said second deployment to a requested status of said second deployment that indicates that said second computer workstation is requested for said second individual; and
    changing, subsequent to said changing said status stored in said second data record from said assigned status of said second deployment to said requested status of said second deployment, said status stored in said second data record from said requested status of said second deployment to said externally deployed status of said second deployment that indicates that said second deployment of said second computer workstation is being processed in said second database managed by said second entity; and
  canceling, subsequent to said changing said status stored in said second data record from said first status associated with said second data record to said second status associated with said second data record, said second deployment, wherein said canceling said second deployment is based on a decision of said second individual to not be said second new employee, and wherein said canceling said second deployment includes:
    generating a second list of identifiers that identify, in a one-to-one correspondence, a second ordered list of software routines that includes said third software routine, said fourth software routine, and a fifth software routine, wherein said generating said second list of identifiers includes building said second list of identifiers from said decision tree stored in said first database;
    creating a second email message that includes a second selectable object and a second hidden field;
    inserting, subsequent to said generating said second list of identifiers, said second list of identifiers into said second hidden field included in said second email message;
    sending, subsequent to said inserting said second list of identifiers, said second email message to said user of said second computing unit;
    receiving, subsequent to said sending said second email message, a selection of said second selectable object by said user of said second computing unit via said pointing device, wherein said selection of said second selectable object is a result of a single activation of said second selectable object without requiring said display of any portion of said first database at said second computing unit;

obtaining, in response to said receiving said selection of said second selectable object, said second list of identifiers from said second hidden field;

retrieving, in response to obtaining said second list of identifiers, said second ordered list of software routines that are stored in said first database;

executing, in response to said retrieving said second ordered list of software routines, said fifth software routine, wherein said executing said fifth software routine includes updating said status of said second deployment from said externally deployed status of said second deployment to said requested status of said second deployment;

executing, subsequent to said executing said fifth software routine, said third software routine, wherein said executing said third software routine further includes updating said requested status of said second deployment to said assigned status of said second deployment; and executing, subsequent to said executing said third software routine, said fourth software routine, wherein said executing said fourth software routine further includes updating said assigned status of said second deployment to said starting status of said second deployment, and wherein said executing said fourth software routine further includes storing, in said computer data storage unit, said starting status of said second deployment to indicate a cancelation of said second deployment.

6. The non-transitory computer readable storage medium, wherein said method further comprises:

changing a status stored in a second data record from a first status associated with said second data record to a second status associated with said second data record, wherein said first status associated with said second data record is a starting status of a deployment of a second computer workstation (second deployment) to a second individual who is being processed as a second new employee of said first entity, wherein said second status associated with said second data record is a scheduled status of said second deployment, wherein said second data record is stored in said first database managed by said first entity, and wherein said changing said status stored in said second data record from said first status associated with said second data record to said second status associated with said second data record includes:

changing said status stored in said second data record from said starting status of said second deployment to an assigned status of said second deployment that indicates that said second computer workstation is allocated to said second individual;

changing, subsequent to said changing said status stored in said second data record from said starting status of said second deployment to said assigned status of said second deployment, said status stored in said second data record from said assigned status of said second deployment to a requested status of said second deployment that indicates that said second computer workstation is requested for said second individual;

determining, subsequent to said changing said status stored in said second data record from said assigned status of said second deployment to said requested status of said second deployment, that said second data record is not to be processed in said second database managed by said second entity; and changing, subsequent to said determining that said second data record is not to be processed in said second database managed by said second entity, said status stored in said second data record from said requested status of said second deployment to a scheduled status of said second deployment that indicates that a date for said second deployment is scheduled; and canceling, subsequent to said changing said status stored in said second data record from said first status associated with said second data record to said second status associated with said second data record, said second deployment, wherein said canceling said second deployment is based on a decision of said second individual to not be said second new employee, and wherein said canceling said second deployment includes:

generating a second list of identifiers that identify, in a one-to-one correspondence, a second ordered list of software routines that includes said second software routine, said third software routine, and said fourth software routine, wherein said generating said second list of identifiers includes building said second list of identifiers from said decision tree stored in said first database;

creating a second email message that includes a second selectable object and a second hidden field;

inserting, subsequent to said generating said second list of identifiers, said second list of identifiers into said second hidden field included in said second email message;

sending, subsequent to said inserting said second list of identifiers, said second email message to said user of said second computing unit;

receiving, subsequent to said sending said second email message, a selection of said second selectable object by said user of said second computing unit via said pointing device, wherein said selection of said second selectable object is a result of a single activation of said second selectable object without requiring said display of any portion of said first database at said second computing unit;

obtaining, in response to said receiving said selection of said second selectable object, said second list of identifiers from said second hidden field;

retrieving, in response to obtaining said second list of identifiers, said second ordered list of software routines that are stored in said first database;

executing, in response to said retrieving said second ordered list of software routines, said second software routine, wherein said executing said second software routine further includes updating said status of said second deployment from said scheduled status of said second deployment to said requested status of said second deployment;

executing, subsequent to said executing said second software routine, said third software routine, wherein said executing said third software routine further includes updating said requested status of said second deployment to said assigned status of said second deployment; and executing, subsequent to said executing said third software routine, said fourth software routine, wherein said executing said fourth software routine further includes updating said assigned status of said second deployment to said starting status of said second deployment, and wherein said executing said fourth software routine further includes storing, in said computer data storage unit, said starting status of said second deployment to indicate a cancelation of said second deployment.

* * * * *